(12) United States Patent
Chian et al.

(10) Patent No.: US 7,170,762 B2
(45) Date of Patent: Jan. 30, 2007

(54) LOW VOLTAGE DC-DC CONVERTER

(75) Inventors: Brent Chian, Plymouth, MN (US); Douglas D. Bird, Little Canada, MN (US); Jonathan S. McDonald, Bloomington, MN (US)

(73) Assignee: Honeywell International Inc., Morrsitown, NJ (US)

( * ) Notice: Subject to any disclaimer, the term of this patent is extended or adjusted under 35 U.S.C. 154(b) by 611 days.

(21) Appl. No.: 10/643,531

(22) Filed: Aug. 18, 2003

(65) Prior Publication Data

US 2005/0041437 A1   Feb. 24, 2005

(51) Int. Cl.
*H02M 3/335* (2006.01)
(52) U.S. Cl. ........................................ 363/19
(58) Field of Classification Search ............... 363/18, 363/19, 20, 21.01, 49, 131
See application file for complete search history.

(56) References Cited

U.S. PATENT DOCUMENTS

| | | | |
|---|---|---|---|
| 4,696,639 A | 9/1987 | Bohan, Jr. | 431/59 |
| 4,734,658 A | 3/1988 | Bohan, Jr. | 331/117 |
| 4,770,629 A | 9/1988 | Bohan, Jr. | 431/59 |
| 4,890,210 A * | 12/1989 | Myers | 363/21.11 |
| 4,984,981 A | 1/1991 | Pottebaum | 431/80 |
| 5,931,655 A | 8/1999 | Maher, Jr. | 431/14 |
| 6,237,855 B1 | 5/2001 | Stickney et al. | 237/8 |
| 6,252,781 B1 * | 6/2001 | Rinne et al. | 363/16 |

* cited by examiner

Primary Examiner—Adolf Berhane

(57) ABSTRACT

A direct current to direct current voltage converter (DC-DC converter) in accordance with the invention comprises a transformer coupled with a voltage source and a self-starting oscillator that includes a secondary winding of the transformer, a capacitor; and a first switch coupled to conduct current from the DC source via a primary winding of the transformer. The first switch is a normally closed switch. The DC-DC converter also comprises a second switch coupled to conduct current in a parallel path with the first switch, the second switch being a normally open switch having a lower saturation resistance than the first switch.

31 Claims, 4 Drawing Sheets

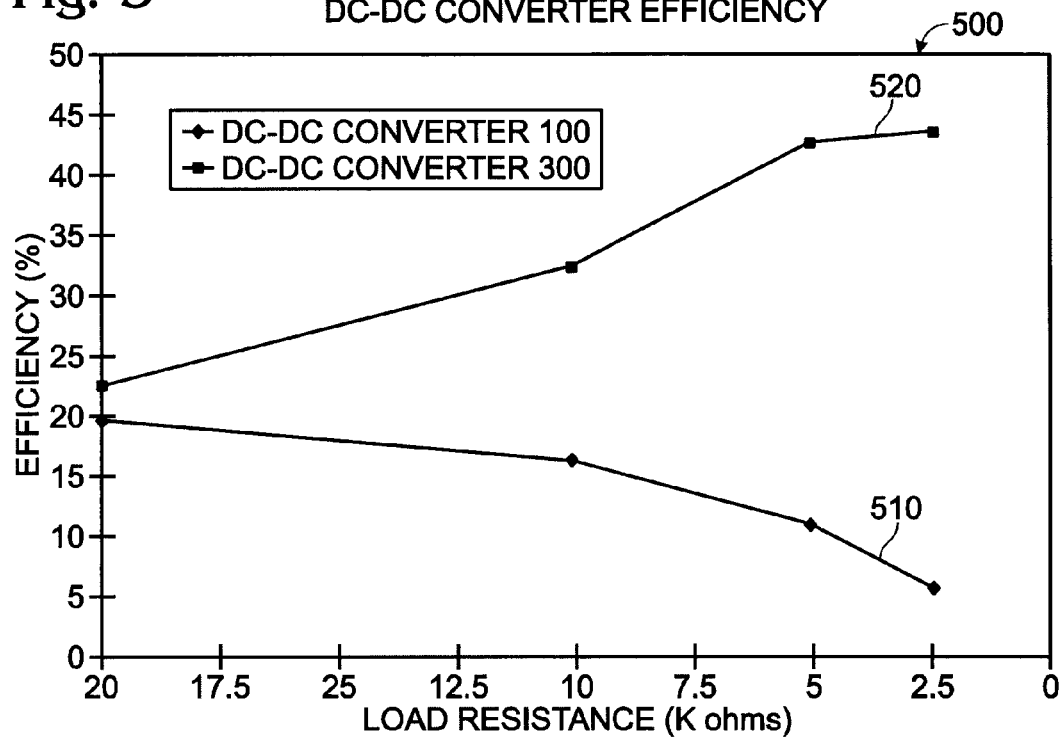
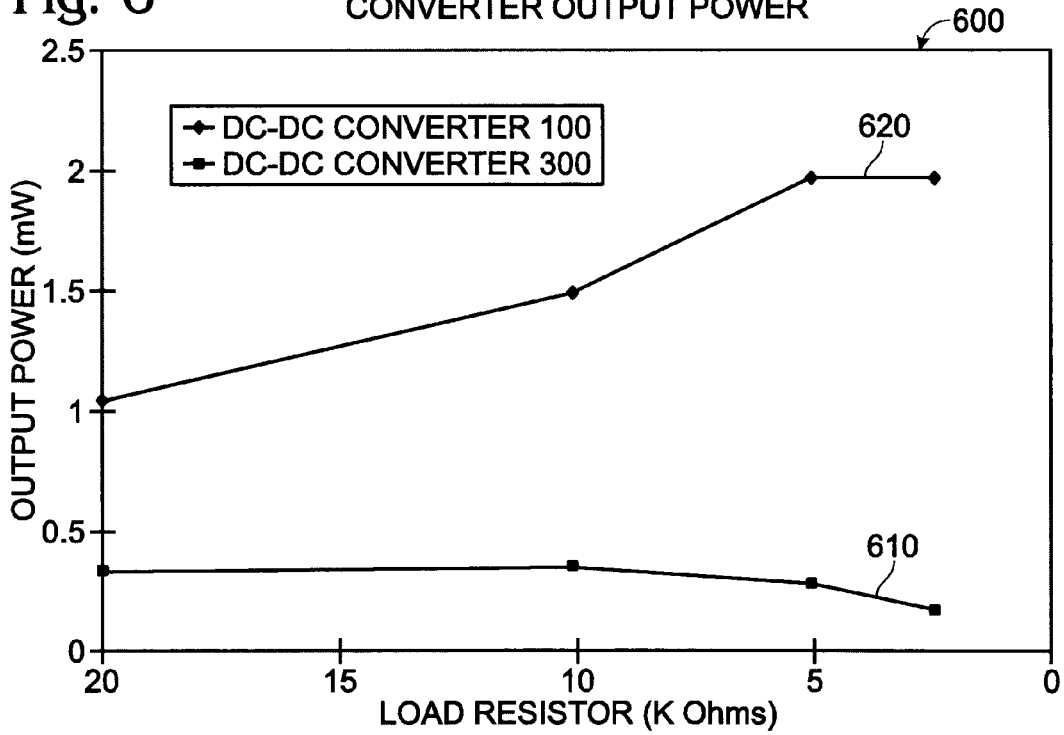

LOW VOLTAGE DC-DC CONVERTER

FIELD

The present invention relates to direct current to direct current voltage converters (DC-DC converters) and, more particularly, to low-voltage, self-starting DC-DC converters.

BACKGROUND

Various applications exist where low voltages are used to power a circuit or system. As one example, gas powered appliances may use a self-powered control circuit and/or system. In this respect, a thermally activated power source is typically used to provide electrical power to such a control circuit and/or system. Such thermally activated power sources typically have limited voltage potential. Therefore, a direct current to direct current voltage converter (DC-DC converter) is normally employed in such circuits to "step-up" (or "boost") the voltage produced by the thermally activated (or other low potential) DC source. In certain applications, it may also be desirable that such a DC-DC converter includes a self-starting oscillator (e.g. an oscillator that starts when a voltage potential is applied to it). Such DC-DC converters may be termed self-starting boost converters.

Current approaches for such DC-DC converters, however, have certain limitations. For example, such DC-DC converters with self-starting oscillators may have power conversion efficiencies (the ratio of output power to input power) on the order of less than twenty percent (20%). Depending on the electrical power consumed by a particular circuit coupled with such a DC-DC converter, there may be insufficient electrical energy produced to supply enough power to the circuit. Therefore, alternative approaches for implementing such DC-DC converters may be desirable.

SUMMARY

A direct current to direct current voltage converter (DC-DC converter) in accordance with the invention comprises a transformer coupled with a voltage source and a self-starting oscillator that includes a secondary winding of the transformer, a capacitor; and a first switch coupled to conduct current from the DC source via a primary winding of the transformer. The first switch is a normally closed switch. The DC-DC converter also comprises a second switch coupled to conduct current in a parallel path with the first switch, the second switch being a normally open switch having a lower saturation resistance than the first switch.

BRIEF DESCRIPTION OF THE DRAWINGS

The subject matter regarded as the invention is particularly pointed out and distinctly claimed in the concluding portion of the specification. The invention, however, as to both organization and method of operation, together with features and advantages thereof, may best be understood by reference to the following detailed description when read with the accompanying drawings in which:

FIG. 5 is a graph showing a comparison of output power efficiency for the circuits shown in FIGS. 1 and 2 at various load resistances;

FIG. 6 is a graph showing a comparison of output power for the circuits show in FIGS. 1 and 2 at various load resistances;

DETAILED DESCRIPTION

Figure 1:
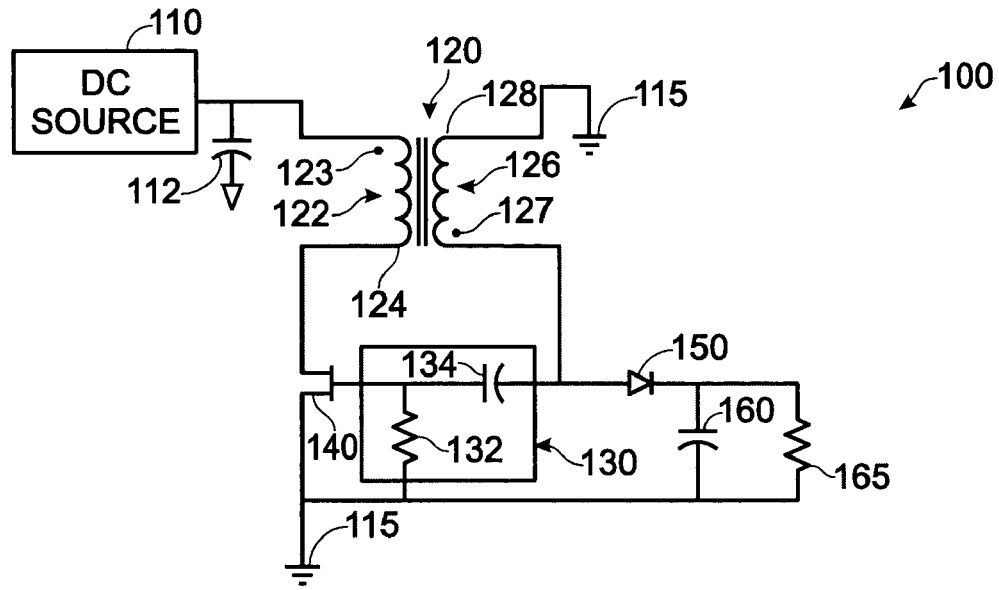
FIG. 1 is a schematic diagram illustrating a prior art circuit for low voltage direct current to direct current (DC-DC) voltage conversion.

In the following detailed description, numerous specific details are set forth in order to provide a thorough understanding of the invention. However, it will be understood that the present invention may be practiced without these specific details. In other instances, well-known methods, procedures, components and circuits have not been described in detail, so as not to obscure the present invention.

As was previously indicated, current approaches for low-voltage, self-starting boost converters have certain limitations, such as their power conversion efficiency. In this respect, referring now to FIG. 1, a schematic diagram of such a prior DC-DC converter 100 is shown.

The DC-DC converter 100 comprises a DC source 110, which may be a thermal voltage source, or any other suitable low voltage potential DC source. In this context, low voltage means that the DC source produces a voltage potential that is in the range of hundreds of millivolts. The DC source 110 may take the form of a thermopile device, which includes serially connected thermocouple devices. The converter 100 also comprises a capacitor 112 coupled with the DC source. The DC source 110 is also coupled with a transformer 120 that comprises a primary winding 122 and a secondary winding 126. Each of the windings comprises a positive terminal (indicated with a dot) and a negative terminal. For the primary winding, the positive terminal is designated 123 and the negative terminal is designated 124. For the secondary winding, the positive terminal is designated 127 and the negative terminal is designated 128. As may be seen in FIG. 1, the negative terminal 128 of the secondary winding 126 is coupled with a ground terminal 115.

The DC-DC converter 100 also includes a resistive-capacitive (RC) circuit 130 that is coupled with the positive terminal 127 of the secondary winding 126, and with the ground terminal 115. The RC circuit 130 comprises a resistor 132 and a capacitor 134. The resistor 132 provides a discharge path for the capacitor 134. The JFET 140 acts as a switch for the DC-DC converter 100 by conducting current from the DC source 110 through the primary winding 122, which, in turn, induces a voltage potential and a corresponding current in the secondary winding 126 via the mutual inductance of the transformer 120. The operation of the DC-DC converter 100 will be described in more detail below with reference to FIG. 2.

Briefly, however, the capacitor 134 of the RC circuit 130 forms part of a self-starting oscillator of the DC-DC converter 100. In this regard, the secondary winding 126 and the capacitor 134 form an inductive-capacitive (LC) feedback circuit. The use of the JFET 140 allows the self-starting oscillator of the DC-DC converter 100 to self-start because the JFET 140 is a normally on switch. In this respect, current will begin to flow in the primary winding 122 (through the JFET 140) when first supplied by the DC source 110 without a voltage being applied to the gate of the JFET 140. This allows the self-starting oscillator of the DC-DC converter 100 to begin oscillating once the voltage supplied by the DC source (and the secondary winding) achieves a sufficient level and induces a voltage and current in the secondary winding 126. As part of this oscillation, the JFET 140 is repeatedly switched between its normally closed (conducting) state and an open (non-conducting) state.

The DC-DC converter 100 further comprises a diode 150, which is coupled with the RC circuit 130 and further coupled with a second capacitor 160. The capacitor 160 stores a stepped-up voltage that is generated by the DC-DC converter 100. The diode 150 acts as a rectifying device for voltage/current communicated from the secondary winding 126 for generating the stepped up voltage. Such diode/capacitor configurations for boost converters are known and will not be discussed in further detail here. The DC-DC converter is typically used to drive a load, which may vary in impedance. For the DC-DC converter 100, this load is represented by a resistor 165.

Figure 2:
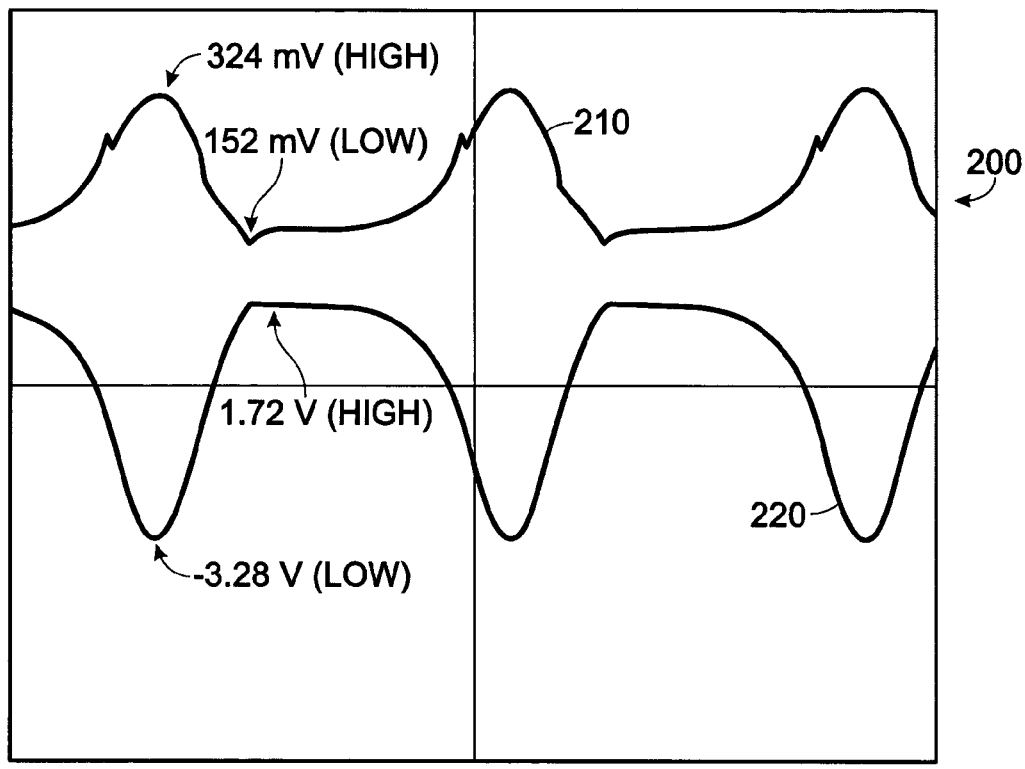
FIG. 2 is a timing diagram showing the relationship of voltages at two nodes of the circuit shown in FIG. 1 when in operation.

Referring now to FIG. 2, a timing diagram showing the operational relationship of two voltages of the DC-DC converter 100 of FIG. 1 is shown. A first trace 210 represents the voltage at the drain terminal of the JFET 140 (and the negative terminal 124 of the primary winding 122). A second trace 220 represents the voltage at the positive terminal 127 of the secondary winding 126. It is noted that for the timing relationship shown in FIG. 2, the DC-DC converter 100 is assumed to be operating after a start-up period where the self-starting oscillator begins oscillating, and that the DC-DC converter 100 is generating a stepped up voltage that is being stored on the capacitor 160. It is also assumed that the DC source is a low-voltage source with an output voltage that is approximately 100–700 millivolts mV under load. It is noted that, for FIG. 2, the voltage scale for the trace 210 is 100 mV per vertical division and the voltage scale for the trace 220 is 2 volts (V) per vertical division. In addition, in FIG. 2, the time scale for both traces 210 and 220 is two microseconds (us) per horizontal division.

When the voltage on the positive terminal 127 of the secondary winding 126, which is represented by the trace 220, is at its high point (approximately 1.7 V for this embodiment), the JFET 140 is conducting current in the saturation region. In this regard, n-type JFETs, such as the JFET 140, typically have a channel resistance of approximately 8 to 14 ohms when conducting in the saturation region. The JFET 140 sinks current supplied by the DC source 110 via the primary winding 122. Because of this current conduction, the voltage on the drain of the JFET 140 (which is represented by the trace 210) drops from approximately 325 mV to approximately 190 mV. As may be inferred from the voltage trace 210, the current in the primary winding 122 increases as the JFET 140 approaches saturation, and then reaches its peak while the JFET 140 is operating in saturation region (e.g. while the voltage on the drain of the JFET 140 is approximately 190 mV). Once the current reaches its peak value, it will begin to decrease. As a result of the decreasing current, a negative voltage is generated at the positive terminal 127 of the secondary winding 126, as is indicated by the trace 220 in FIG. 2. The negative voltage on the positive terminal 127 results in the JFET 140 being gradually switched off (to a non-conducting state). In this regard, when the voltage represented by the trace 220 reaches approximately −0.8 v (which corresponds to a voltage of approximately −2.0 V on the gate terminal of the JFET 140), the JFET 140 is in its off (non-conducting) state. During the time that the JFET 140 is in its off state, the voltages represented by the traces 210 and 220 may be said to be in a free oscillation state.

The DC-DC converter 100 is considered to be in the free oscillation state until the voltage on the positive terminal 127 of the secondary winding 126 (as shown by trace 220) returns to approximately −0.8 V (which, again, corresponds to approximately −2.0V being present on the gate of the JFET 140). At this point, the JFET 140 will begin to enter a conductive state again (the linear region of operation) and transition (from the linear region of operation) to operating in saturation. In this regard, as the JFET 140 begins to conduct current again, the current through the primary winding 122 also begins to increase again. Thus, a positive voltage (and current) is again induced in the secondary winding 126, which then drives the gate of the JFET 140. This positive feedback eventually results in the JFET 140 operating in saturation. Then, as described above, the current in the secondary winding 126 will reach its peak level and then start to decrease, thus causing the entire cycle described above to be repeated.

As was noted above, the channel resistance of the JFET 140 is typically in the range of 8–10 ohms. This channel resistance is relatively high, as compared to some other types of semiconductor switches. While the use of the JFET 140 for forming a self-starting oscillator is advantageous due to its normally on characteristic, the relatively high resistance of the JFET 140 in the saturation mode contributes to the DC-DC converter 100 having a low efficiency (ratio of output power to input power). The efficiency of the DC-DC converter 100 is about twenty percent (20%) or less, depending on the impedance (or resistance) of the load being driven by the DC-DC converter 100. In this regard, the DC-DC converter 100 is much less efficient when driving lower load impedances, as will discussed in further detail below with respect to FIG. 5.

Thus, alternative approaches for implementing such DC-DC converters are desirable.

Figure 3:
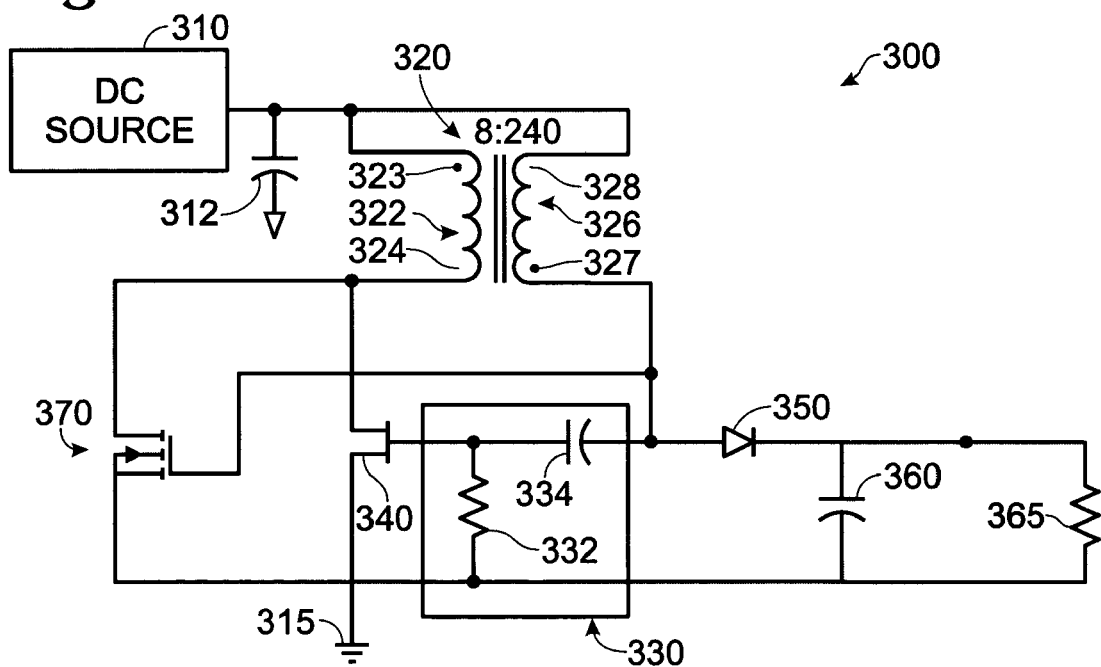
FIG. 3 is a schematic diagram illustrating a circuit for low voltage DC-DC voltage conversion in accordance with an embodiment of the invention.

Referring now to FIG. 3, a schematic diagram of a DC-DC converter 300 with improved efficiency in accordance with an embodiment of the invention is shown. The DC-DC converter 300 has a number of analogous components with the DC-DC converter 100. These analogous components are indicated with 300 series reference numbers that correspond with the 100 series reference numbers used for the DC-DC converter 100. Thus, for the sake of brevity these analogous components (310–365) will not be discussed in detail again with respect to FIG. 3, and will be only be discussed with regard to understanding the differences, additional details and advantages of the DC-DC converter 300 over the DC-DC converter 100.

For the DC-DC converter 300, the capacitor 312 contributes to the efficiency of the DC-DC converter 300 in a more substantial way than does the capacitor 112 of the DC-DC converter 100 shown in FIG. 1. This efficiency improvement is due, in part, to the capacitor acting as a reserve current source for the transformer 320 during operation of the DC-DC converter 300. For the DC-DC converter 100, the transformer 120 has relatively low transient current draws and, therefore, any reserve current available in the capacitor 112 has relatively little effect on the efficiency of the DC-DC converter 100, as compared to the DC-DC converter 300.

The transformer 320 of the DC-DC converter 300 has a very high secondary turns to primary turns ratio (turns ratio).

As indicated in FIG. 3, this ratio is 30:1 (e.g., 240 secondary turns as compared to 8 primary turns). This turns ratio provides for generating a stepped up voltage with the DC-DC converter 300, and is substantially similar to the transformer 120 of the DC-DC converter 100. The invention is of course not limited to this turns ratio, and other transformer configurations may be used. In this respect, the configuration of the transformer 320 may depend, at least in part, on the materials used to construct the transformer, the power consumption of any circuit coupled with the DC-DC converter 300, among any number of other considerations.

As may also be seen in FIG. 3, the negative terminal 328 of the secondary winding 326 is coupled with the positive terminal 323 of the primary winding 322 and the DC source 310, as compared to the negative terminal of the secondary winding 126, which is coupled to the ground terminal 115. The configuration shown in FIG. 3, while somewhat non-conventional, may provide some efficiency gains for the DC-DC converter 300, depending on the particular embodiment, as the primary winding is provided with a substantially constant voltage bias by the DC source 310.

The DC-DC converter 300 further comprises an enhancement mode n-channel metal-oxide-semiconductor field effect transistor (MOSFET) 370, which acts as second switch for the DC-DC converter 300. As will be discussed in further detail below, the use of the MOSFET 370, as shown in FIG. 3, may dramatically increase the power conversion efficiency of the DC-DC converter 300 (because of is lower resistance when operating in saturation), as compared with the DC-DC converter 100.

Drain and source terminals of the MOSFET 370 are coupled with the drain and source terminals of the JFET 340 (and also, respectively, with the negative terminal 324 of the primary winding 322 and the ground terminal 315). Thus, the MOSFET 370 conducts current in a parallel path with the JFET 340. The gate terminal of the MOSFET 370, however, is coupled directly with the positive terminal 327 of the secondary winding 326.

Because the MOSFET 370 is a normally off device, it will not efficiently conduct current until a sufficient positive voltage is applied to its gate terminal. In this regard, the MOSFET 370 does not substantially contribute to (or impede) the self-starting operation of the DC-DC converter 300, but begins to operate once the DC-DC converter 300 has begun oscillating.

Figure 4:
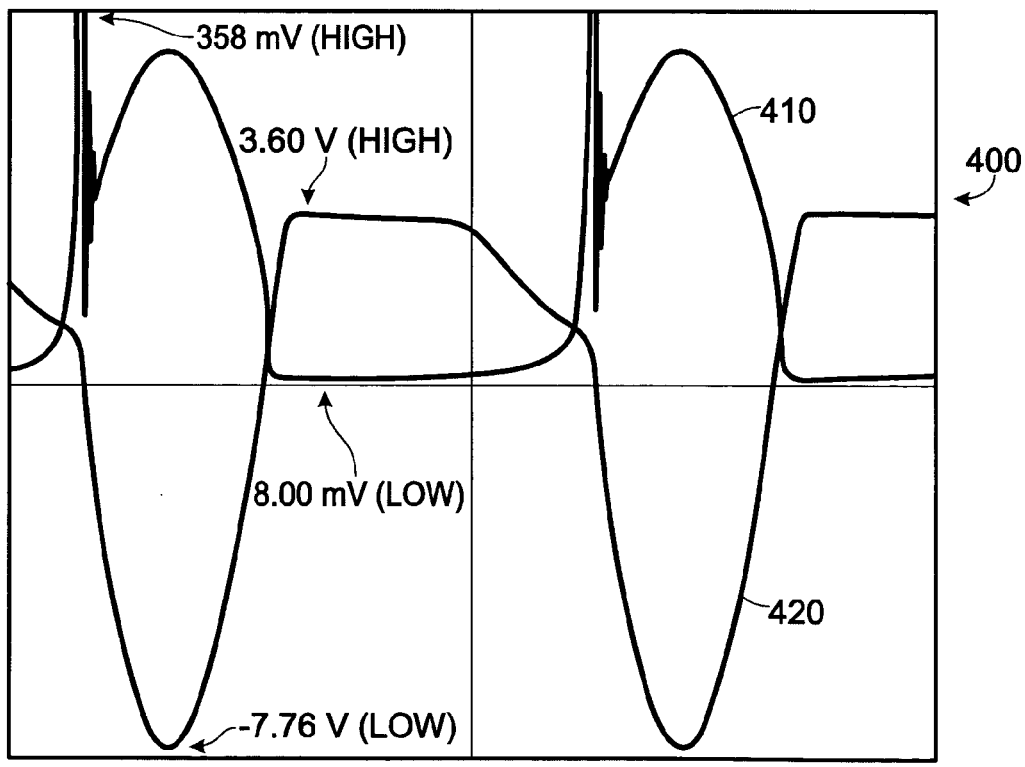
FIG. 4 is a timing diagram showing the relationship of two voltages at two nodes of the circuit shown in FIG. 3 that are analogous with the voltages shown in FIG. 2.

Referring now to FIG. 4, a timing diagram showing the operational relationship of two voltages of the DC-DC converter 300, which are comparable with the voltages shown in FIG. 2, is shown. These voltages, when compared with those in FIG. 2, demonstrate the improved performance of the DC-DC converter 300 over the DC-DC converter 100. In this respect, a first trace 410 represents the voltage at the drain terminal of the MOSFET 370 and the JFET 340 (as well as the negative terminal 324 of the primary winding 322). A second trace 420 represents the voltage at the positive terminal 427 of the secondary winding 426 and the gate of the MOSFET 370. The voltage traces 410 and 420 have the same vertical and horizontal scales as the voltage traces 210 and 220 in FIG. 2 and, therefore, are directly comparable.

When the voltage on the gate of the MOSFET 370 (at the positive terminal 327 of the secondary winding 326), which is represented by the trace 420, is above approximately 1.6 V, the MOSFET 370 is operating in its saturation state. As may be seen from FIG. 4, in this situation, the voltage on the drain of the MOSFET 370 (and the drain of the JFET 340) drops to about 5 mV (as compared to 190 mV for the DC-DC converter 100) due to the much lower channel resistance of the MOSFET 370. This allows more current to be conducted in the primary winding 322 of the transformer 320 and, as a result, induces a higher voltage and current in the secondary winding 326. In this regard, as may be seen from the trace 420, the peak voltage at the positive terminal 327 of the secondary winding 326 is approximately 3.6 V for this embodiment, which is more than two times that of the DC-DC converter 100, as shown in FIG. 2.

It is also noted that the switching time for the MOSFET 370 to turn on (enter saturation) is approximately 0.4 us, versus approximately 1.0 us for the JFET 140 of the DC-DC converter 100. This switching time is shown by the trace 410 (and by the trace 210 in FIG. 2) and is indicated on the horizontal axis as 430 (and indicated as 230 in FIG. 2). This reduction in the switch switching time for the DC-DC converter 300 further improves its efficiency as compared with the DC-DC converter 100. In this regard, the efficiency improvements due to the reduction in switching time are because less electrical energy is consumed by switching the MOSFET 370, as the time it operates in the linear region is less than that of the JFET 140 for the DC-DC converter 100.

Referring now to FIG. 5, a graph 500 that compares the efficiency of the DC-DC converter 300 with the efficiency of the DC-DC converter 100 at various load resistances is shown. A first trace 510 shows the efficiency, in percent, of the DC-DC converter 100 shown in FIG. 1 at various load resistances. A second trace 520 shows the efficiency of the DC-DC converter 300 shown in FIG. 3 at the same load resistances. As may be seen in FIG. 5, at a load resistance of approximately 2.4 kilo-ohms (k-ohms), the efficiency of the DC-DC converter 300 is about 43% while the efficiency of the DC-DC converter 100 is about 5%. From FIG. 5, it may be seen that the DC-DC converter 300 is more efficient than the DC-DC converter 100 up to (and above) load resistances of 20 k-ohms. In fact, the efficiency of the DC-DC converter 300 is more than two times that of the DC-DC converter 100 up to a load resistance of approximately 10 k-ohms.

Referring now to FIG. 6, a graph 600 is shown that compares the output power of the DC-DC converter 300 with the output power of the DC-DC converter 100 at the same various load resistances that were used for the efficiency comparison shown in FIG. 5. A first trace 610 shows the output power, in milliwatts (mW), of the DC-DC converter 100 shown in FIG. 1 at the various load resistances. A second trace 620 shows the output power of the DC-DC converter 300 shown in FIG. 3 at the same load resistances. As may be seen in FIG. 5, at a load resistance of approximately 2.4 kilo-ohms (k-ohms), the output power of the DC-DC converter 300 is almost 2 mW while the output power of the DC-DC converter 100 is less than 0.5 mW. From FIG. 6, it may be seen that the DC-DC converter 300 produces from approximately two to four times the output power of the DC-DC converter 100 (for the same load resistance) up to load resistances of 20 k-ohms.

Figure 7:
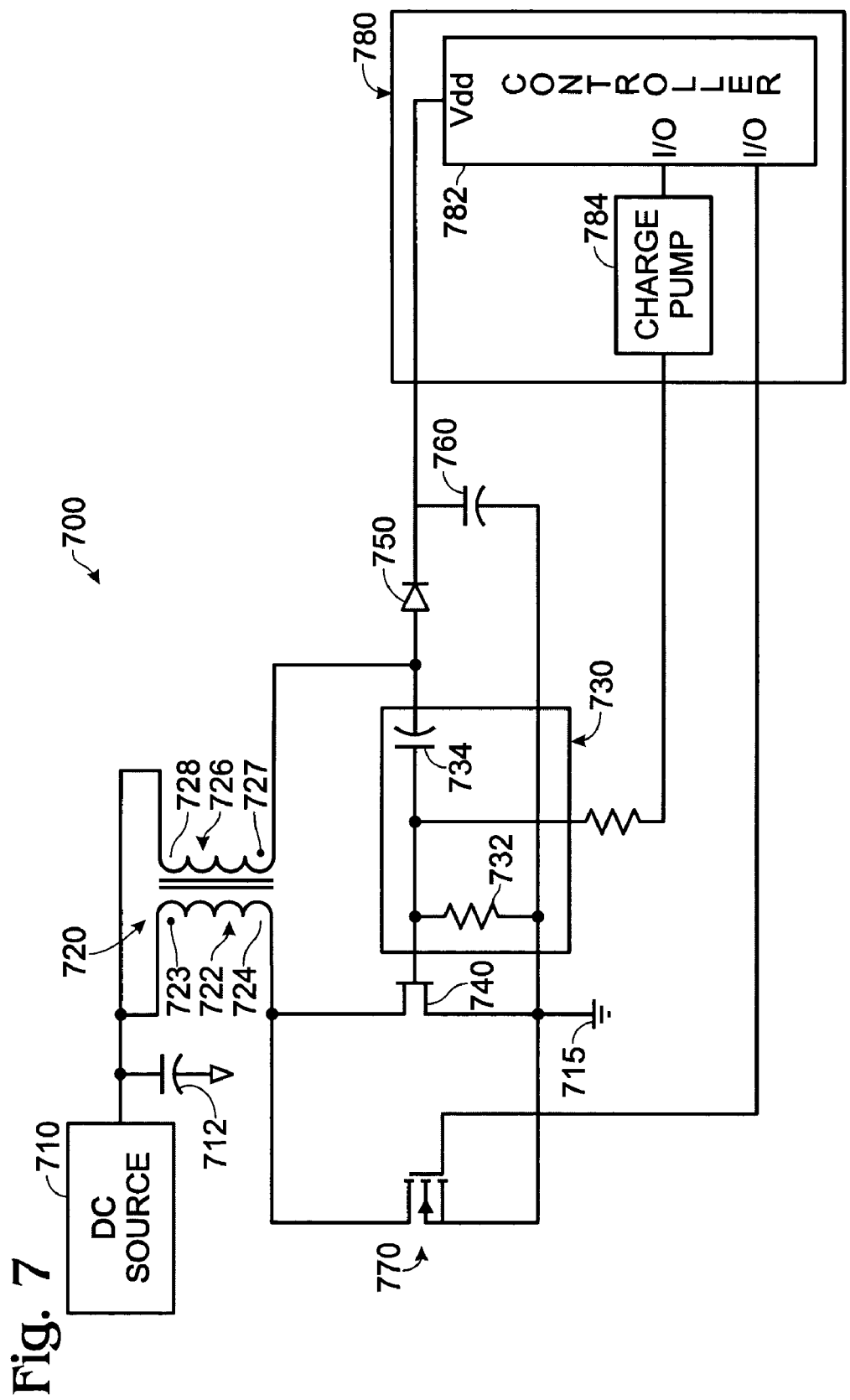
FIG. 7 is a schematic diagram illustrating an alternative circuit for low voltage DC-DC voltage conversion in accordance with an embodiment of the invention.

Referring now to FIG. 7, a schematic diagram of an alternative DC-DC converter 700 is shown. The DC-DC converter 700 contains the same components as the DC-DC converter 300.

These components are indicated with corresponding 700 series reference numbers (710–760) and will not be discussed in detail with respect to FIG. 7. In this regard, only the differences between the DC-DC converter 700 and the DC-DC converter 300 are noted.

The DC-DC converter 700 further comprises a control circuit 780 that includes a programmable controller 782 and a negative charge pump circuit 784. The gate of the MOS- FET 770 is coupled with an input/output (I/O) channel of the controller 782 and the gate of the JFET 740 is coupled with an output terminal of the charge pump 784. The charge pump 784 is further coupled with another I/O channel of the controller 782. A supply voltage (Vdd) terminal of the controller 724 is coupled with the capacitor 760 and, thus, is powered by the stepped up voltage generated by the DC-DC converter 700. It is noted that controller 782 may be coupled with other circuitry (not shown), such as gas valves or other electrically operated components. In addition, the controller 782 may include software instructions for controlling the DC-DC converter 700 (as well as any other circuitry it is coupled with).

The controller 782 may also include an analog-to-digital (A/D) converter that senses the voltage on its Vdd terminal. Once that voltage (the stepped-up voltage) has reached a level that will allow the controller 782 to operate reliably, the controller 782 may begin to execute software instructions to actively manage the DC-DC converter 700. In this regard, the controller 782 may toggle the I/O channel coupled with the charge pump 784, which will disable (turn off) the JFET 740. Further, the controller 782 may toggle the I/O channel coupled with the gate of the MOSFET 770 to control the generation of the stepped up voltage generated by the DC-DC converter 700.

In this regard, if the controller (using the A/D converter) determines that the voltage supplied to its Vdd terminal is below a certain lower threshold, the controller 782 may effect opening and closing of the MOSFET 770 to generate additional stepped-up voltage potential in a similar manner as was discussed above with respect to FIG. 3. Likewise, if the controller 782 detects that voltage on it Vdd terminal is above a certain higher threshold, the controller 782 may leave MOSFET 770 off (as well as continuing to pump the charge pump 784 to disable the JFET 740) until such time that the voltage at the Vdd terminal falls below the lower threshold. Such active management of the operation of the DC-DC converter 700 may provide additional efficiency gains on top of those provided by the DC-DC converter 300, as the stepped-up voltage potential is generated "as needed."

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A direct current to direct current voltage converter (DC-DC converter) comprising:
   a transformer coupled with a voltage source;
   a self-starting oscillator that includes:
      a secondary winding of the transformer;
      a capacitor;
      a first switch coupled to conduct current from the DC source via a primary winding of the transformer, the first switch being a normally closed switch; and
   a second switch coupled to conduct current in parallel path with the first switch, the second switch being a normally open switch having a lower saturation resistance than the first switch, wherein the second switch operates once the DC-DC converter has begun oscillating.

2. The DC-DC converter of claim 1, wherein the transformer has a secondary turns to primary turns ratio of approximately thirty to one (30:1).

3. The DC-DC converter of claim 1, wherein the first switch is one of a junction field effect transistor and a depletion mode metal-oxide semiconductor field effect transistor.

4. The DC-DC converter of claim 1, wherein the second switch is an enhancement mode metal-oxide semiconductor field effect transistor.

5. The DC-DC converter of claim 1, further comprising:
   a programmable control circuit coupled with the first and second switches, wherein the control circuit effects opening and closing of the first and second switch based, at least in part, on a stepped up voltage potential generated by the DC-DC converter.

6. A direct current to direct current voltage converter (DC-DC converter) comprising:
   a transformer having a primary and a secondary winding;
   a resistive-capacitive circuit coupled with the secondary winding;
   a first switch having a control terminal coupled with the resistive capacitive circuit, the first switch being further coupled with the primary winding and a ground terminal, the first switch comprising a normally closed switch; and
   a second switch having a control terminal coupled so as to control the generation of a stepped-up voltage based, at least in part, on an output voltage of the DC-DC converter, the second switch being further coupled with the primary winding and the ground terminal so as to conduct current in a parallel path with the first switch.

7. The DC-DC converter of claim 6, further comprising a control circuit coupled with the control terminal of the first switch, the control terminal of the second switch and an output voltage terminal of the DC-DC converter, wherein the control circuit controls the operation of the first and second switches based, at least in part, on the output voltage of the DC–DC converter.

8. The DC-DC converter of claim 7, wherein the control circuit comprises:
   a programmable controller coupled with the output voltage terminal and the second switch; and
   a charge pump circuit coupled with the programmable controller and the first switch.

9. The DC-DC converter of claim 6, wherein the primary and secondary windings of the transformer each comprise a positive terminal and a negative terminal;
   wherein respective first conduction terminals of the first and second switches are coupled with the negative terminal of the primary winding; and
   respective second conduction terminals of the first and second switches are coupled with the ground terminal.

10. The DC-DC converter of claim 9, wherein the positive terminal of the secondary winding is coupled with the control terminal of the second switch and the resistive capacitive circuit.

11. The DC-DC converter of claim 9, wherein the positive terminal of the primary winding is coupled with the negative terminal of the secondary winding.

12. The DC-DC converter of claim 6, wherein a turns ratio of turns of the primary winding to turns of the secondary winding is approximately one to thirty (1:30).

13. The DC-DC-converter of claim 12, wherein the primary winding comprises eight turns and the secondary winding comprises two hundred forty turns.

14. The DC-DC converter of claim 6, wherein the first switch comprises one of an n-type junction field effect transistor and a depletion mode metal-oxide semiconductor field effect transistor (MOSFET); and the second switch comprises an n-type enhancement mode complimentary MOSFET.

15. The DC-DC converter of claim 6, further comprising a rectifying device coupled with the secondary winding and a charge storage device for storing a stepped up voltage, the charge storage device being coupled with the rectifying device.

16. The DC-DC converter of claim 15, wherein the rectifying device comprises a diode; and the charge storage device comprises a capacitor coupled with, and between, the diode and the ground terminal.

17. A direct current to direct current voltage converter (DC-DC converter) comprising:

a transformer having a primary and a secondary winding;

a resistive-capacitive circuit coupled with the secondary winding of the transformer;

a first switch having a control terminal coupled with the resistive capacitive circuit, the first switch being further coupled with the primary winding and a ground terminal, the first switch comprising a normally closed switch; and a second switch having a control terminal coupled with the secondary winding, the second switch being further coupled with the primary winding and the ground terminal, the second switch comprising a normally open switch that is coupled so as to conduct current in a parallel path with the first switch.

18. The DC-DC converter of claim 17, wherein the primary and secondary windings of the transformer each comprise a positive terminal and a negative terminal, the positive terminal of the primary winding being coupled with the negative terminal of the secondary winding.

19. The DC-DC converter of claim 18, wherein the primary and secondary windings of the transformer each comprise a positive terminal and a negative terminal;

wherein respective first conduction terminals of the first and second switches are coupled with the negative terminal of the primary winding; and respective second conduction terminals of the first and second switches are coupled with the ground terminal.

20. The DC-DC converter of claim 18, wherein the control terminal of the second switch is coupled with the positive terminal of the secondary winding.

21. The DC-DC converter of claim 17, further comprising a rectifying device coupled with the secondary winding and a charge storage device for storing a stepped up voltage, the charge storage device being coupled with the rectifying device and the ground terminal.

22. The DC-DC converter of claim 21, wherein the rectifying device comprises a diode; and the charge storage device comprises a capacitor.

23. The DC-DC converter of claim 17, wherein the first switch comprises one of an n-type junction field effect transistor and a depletion mode metal-oxide semiconductor field effect transistor.

24. The DC-DC converter of claim 17, wherein the second switch comprises an n-type enhancement mode complimentary metal-oxide semiconductor field effect transistor.

25. A direct current to direct current voltage converter (DC-DC converter) comprising:

a transformer having a primary and a secondary winding;

a resistive-capacitive circuit coupled with the secondary winding;

a first switch having a control terminal coupled with the resistive capacitive circuit, the first switch being further coupled with the primary winding and a ground terminal, the first switch comprising a normally closed switch; and a second switch having a control terminal coupled with a control circuit that controls the DC-DC converter based, at least in part, on an output voltage of the DC-DC converter to produce a stepped-up voltage on an output voltage terminal of the DC-DC converter, the second switch being further coupled with the primary winding and the ground terminal so as to conduct current in a parallel path with the first switch.

26. The DC-DC converter of claim 25, wherein the control circuit comprises:

a programmable controller coupled with the output voltage terminal and the second switch; and a charge pump circuit coupled with the programmable controller and the first switch.

27. The DC-DC converter of claim 25, wherein the primary and secondary windings of the transformer each comprise a positive terminal and a negative terminal;

wherein respective first conduction terminals of the first and second switches are coupled with the negative terminal of the primary winding; and respective second conduction terminals of the first and second switches are coupled with the ground terminal.

28. The DC-DC converter of claim 25, further comprising a rectifying device coupled with the secondary winding and a charge storage device for storing a stepped up voltage, the charge storage device being coupled with, and between, the rectifying device and the ground terminal.

29. The DC-DC converter of claim 28, wherein the rectifying device comprises a diode; and the charge storage device comprises a capacitor.

30. The DC-DC converter of claim 25, wherein the first switch comprises one of an n-type junction field effect transistor and a depletion mode metal-oxide semiconductor field effect transistor.

31. The DC-DC converter of claim 25, wherein the second switch comprises an n-type enhancement mode complimentary metal-oxide semiconductor field effect transistor.

* * * * *